R. BEMAN.
GAUGE FOR LAMPS.
APPLICATION FILED MAR. 20, 1920.
1,424,067.
Patented July 25, 1922.
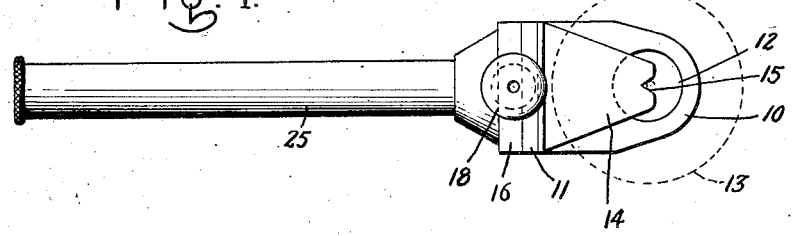
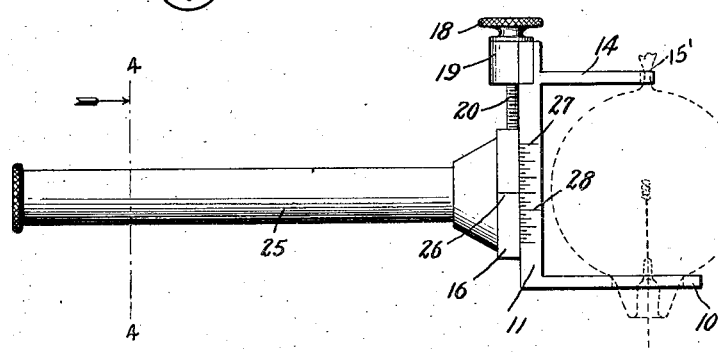
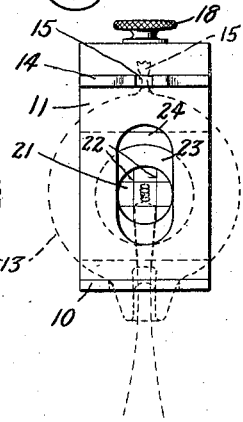
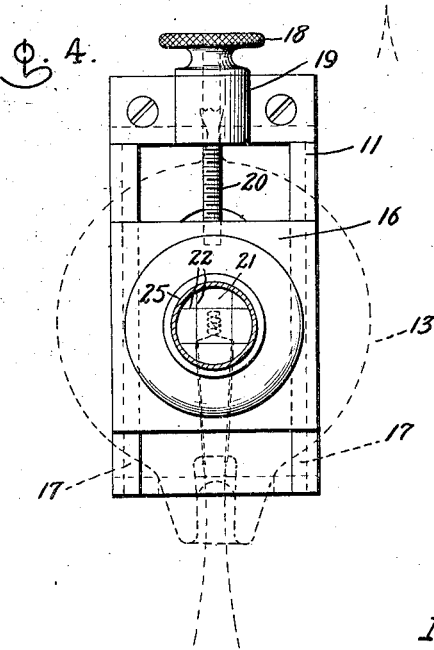
INVENTOR:
RALPH BEMAN,
BY
HIS ATTORNEY.

UNITED STATES PATENT OFFICE.

RALPH BEMAN, OF CLEVELAND, OHIO, ASSIGNOR TO GENERAL ELECTRIC COMPANY, A CORPORATION OF NEW YORK.

GAUGE FOR LAMPS.

1,424,067.     Specification of Letters Patent.     Patented July 25, 1922.

Application filed March 20, 1920. Serial No. 367,507.

*To all whom it may concern:*

Be it known that I, RALPH BEMAN, a citizen of the United States, residing at Cleveland, in the county of Cuyahoga, State of Ohio, have invented certain new and useful Improvements in Gauges for Lamps, of which the following is a specification.

My invention relates to measuring instruments and more particularly to instruments for gauging the light-center length of incandescent electric lamps. The light-center length of lamps with screw bases is the distance from the center of the filament to the extreme end of the center contact on the base. For lamps fitted with bayonet candelabra bases the light-center length is the distance from the center of the filament to a line drawn through the nearer edge of the pins on the base.

Heretofore, difficulty has been experienced in producing incandescent lamps with accurate predetermined light-center lengths. With the large incandescent lamps, the limits of variation of the light-center lengths may have a comparatively wide range without materially affecting the utility of the equipment used with the lamp. However, with miniature lamps the permissible range of the light-center length is necessarily small. The equipment ordinarily used with miniature lamps for automobile service is rendered inefficient unless the light-center length of the lamp is suitable for the particular equipment and is substantially uniform with each lamp adapted to be used therewith.

The methods employed heretofore to prevent unsuitable lamps from being placed on the market have had to do with the inspection of completed lamps and the rejection of those found to be outside certain predetermined limits. This resulted in the loss of a comparatively large number of lamps which had been completely manufactured. As a rule the defects in the light-center length are slight and are due to variations in the length of the stem. The sealing-in machine may be altered to correct the defect if it is discovered during the sealing-in operation. The correction is made by varying the position of the stem with regard to the bulb during the sealing-in operation. In order to discover these defects and, in addition, to determine the actual value thereof, I have provided an instrument for holding the lamp after the sealing-in operation as it will be fastened in the base and, by locating the light source in a predetermined area of an adjustable sighting tube, I am able to find the light-center length of the lamp if based in the usual manner. In order to facilitate the use of the instrument, I have laid out a direct reading scale between the sighting tube and the holding member, and after making a determination of several lamps, the operator is enabled to change the sealing-in machine so that the light-center length of the succeeding lot of lamps will lie within the predetermined limits for light-center length.

In the accompanying drawing, Fig. 1 is a top plan view of an instrument embodying my invention; Fig. 2 is a side elevation thereof; Fig. 3 is an elevation of the holder end thereof; and Fig. 4 is an enlarged elevation thereof on the section line 4—4 of Fig. 2 in the direction of the holder end.

Referring to the drawing, the lower arm 10 of the bulb holding member 11 has an aperture 12 into which the neck of the bulb 13 is placed. The aperture 12 is of the same diameter as the internal diameter of the base to be used with the lamp so that the lamp will occupy the same position with relation to the arm 10 as it would relative to the base. An upper arm 14 of the holding member 11 has a V-shaped groove 15 in the end thereof for the reception of the contraction of the exhaust tube 15′. The lamp is thus aligned in a position so that the filament lies in a plane perpendicular to the lower arm 10. The block 16 slides in grooves 17 on the back of the holding member and may be adjusted up and down by turning the knurled nut 18 positioned in the block 19 on the back of the member 11 and engaing the screw 20 fastened to the upper part of the block 16. In a cavity in the face of the block 16 adjacent the member 11 is placed a glass screen 21 (Fig. 3) having scratched thereon the lines 22 which define the area within which the light source is to be centered. The glass screen 21 is held in place by a ring 23. The member 11 has an opening 24 (Fig. 3) in the path of the upward and downward movement of the glass screen 21.

When the light source is located in the area laid out by the lines 22 by moving the block 16 up and down with the nut 18 while sighting through the tube 25 attached to the center of the block 16, the operator may determine directly the light-center length of the lamp by noting the position of the mark 26 (Fig. 2) relative to the scale 27. The mark 26 is scratched on the edge of the block 16 to correspond to the center of the area laid out on the glass screen 21 by the lines 22. The scale 27 is laid off on the edge of the member 11 and the mark 28 represents one inch which corresponds to the length from the nearer edge of the pins on the base of a bayonet candelabra base to the top of the base plus the length from the top of the lower arm 10 to the mark 28. In the case of a lamp with a screw base the base measurement would be the distance from the extreme end of the center contact on the base to the top of the base.

Having read the scale 27 at the point opposite the mark 26 the operator knows at once the light-center length the lamp will have when based. If this dimension does not fall within the desired light-center length range the operator may change the sealing-in machine to overcome the amount of deviation from the desired light-center length. The change of the sealing-in machine consists in changing the relative vertical position of the spindle which supports the stem and filament and the carrier which supports the glass bulb. If the light-center length is too long, the operator lowers the stem spindle relative to the bulb carrier which causes the flange of the stem to be sealed to the neck of the glass bulb at a lower point. Vice versa, raising the stem spindle relative to the bulb carrier corrects for a short light-center length.

While I have described my instrument as used to correct errors previous to the sealing-in operation it may readily be seen that it could be used as an instrument for regular inspection before basing and could be adapted to inspect lamps after basing. Furthermore, while I have discussed its use with miniature lamps, it should be understood that large lamps may be easily handled.

While I have shown and described a specific instrument embodying my invention, I do not wish to be limited thereto as modifications will readily suggest themselves to those skilled in the art.

What I claim as new and desire to secure by Letters Patent of the United States, is:—

1. In a device for gauging the light center length of an incandescent lamp, the combination of sighting means, a holder mounted thereon for receiving the said lamp and means whereby said holder may be moved with reference to said sighting means, said device being provided with means whereby the extent of said movement may be indicated.

2. An instrument for gauging the light-center length of an incandescent lamp which comprises optical sighting means, means for holding said lamp consisting of an arm for supporting the base end of said lamp and an arm for engaging the tip end thereof, means for adjusting the said holding means with reference to the said optical sighting means and for measuring the movement of the said holding means with reference to the said optical sighting means.

3. A device for gauging the light center length of an incandescent lamp comprising a holder consisting of a member having extending therefrom an arm for receiving the base end of said lamp and an arm for receiving the tip end thereof, a sighting tube and means whereby said holder is movably mounted on said tube so that the latter extends in a direction opposite to that of said arms, said device being provided with means whereby the amount of relative movement of said holder and tube may be indicated.

4. A device for gauging the light center length of an incandescent lamp comprising a holder consisting of a vertical member having horizontal arms extending from one side thereof to engage respectively the base and tip ends of said lamp, a sighting tube extending horizontally from the other side of said member and means whereby said holder and said tube may be raised or lowered with respect to each other, said device being provided with means whereby the extent of such movement may be indicated.

In witness whereof, I have hereunto set my hand this 17 day of March 1920.

RALPH BEMAN.